United States Patent [19]

Schaefer

[11] 4,103,478

[45] Aug. 1, 1978

[54] MOWER SUPPORT FOR REAR MOUNTED GRASS CATCHER

[75] Inventor: Daniel W. Schaefer, Port Washington, Wis.

[73] Assignee: Allis-Chalmers Corporation, Milwaukee, Wis.

[21] Appl. No.: 774,515

[22] Filed: Mar. 3, 1977

[51] Int. Cl.² ............................................. A01D 53/06
[52] U.S. Cl. ........................................ 56/205; 56/16.6
[58] Field of Search ................. 56/202, 205, 206, 194, 56/16.6

[56] References Cited

U.S. PATENT DOCUMENTS

| 3,112,597 | 12/1963 | Heth et al. | 56/194 |
|---|---|---|---|
| 3,132,457 | 5/1964 | Slemmons | 56/16.6 |
| 3,134,214 | 5/1964 | Shaw | 56/202 |
| 3,568,421 | 3/1971 | Smith | 56/202 |
| 3,668,846 | 6/1972 | Knight | 56/205 |
| 3,928,956 | 12/1975 | Boyer | 56/202 |
| 3,962,852 | 6/1976 | Boyer | 56/202 |
| 4,051,648 | 10/1977 | Uhlinger et al. | 56/17.5 |

Primary Examiner—Louis G. Mancene
Assistant Examiner—Paul J. Hirsch
Attorney, Agent, or Firm—Robert C. Jones

[57] ABSTRACT

A support for a rear mounted flexible grass catcher container is mounted directly to the mower body and is free to pivot back for clearing the container from the mower shroud, when necessary for service purposes, without disconnecting the support from the mower. The support pivot is disposed in a manner that the applied load from the grass catcher container causes a resulting moment which tends to hold the container rear support in operative position without the necessity of providing clamps or catches. In addition, the rear support serves as a barrier for the container preventing its engagement with the adjacent rear wheels of the mower.

4 Claims, 4 Drawing Figures

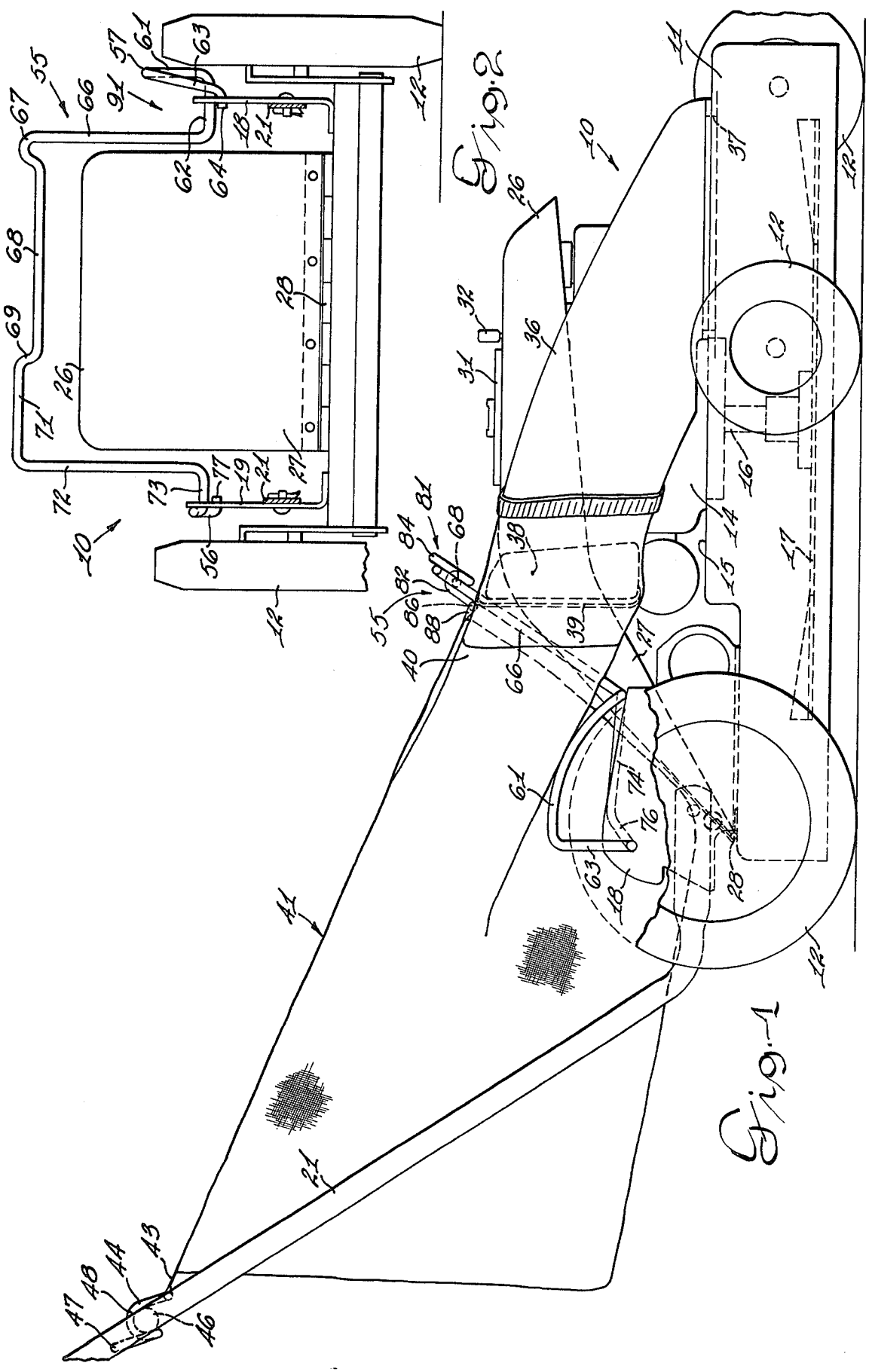

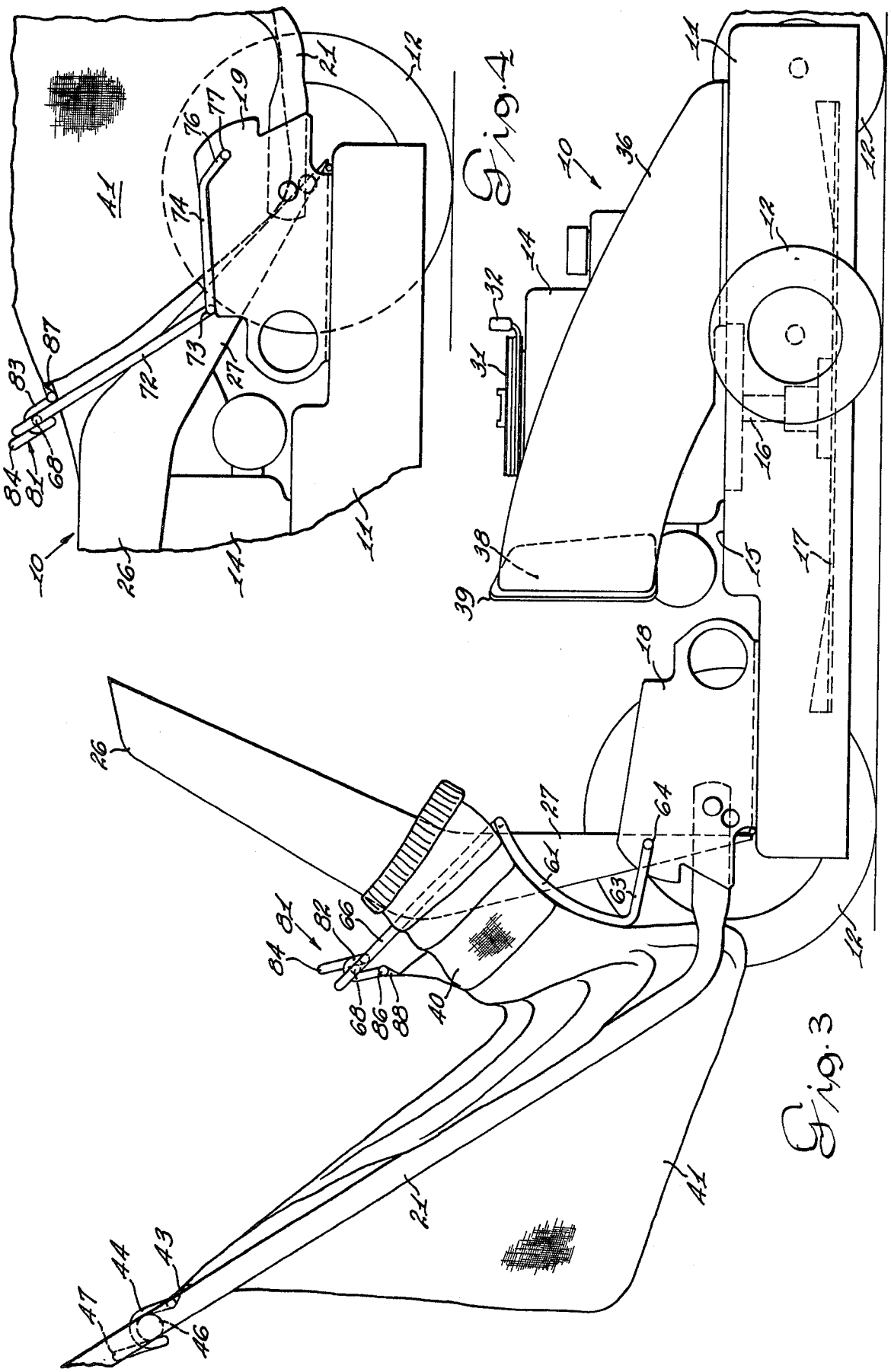

MOWER SUPPORT FOR REAR MOUNTED GRASS CATCHER

BACKGROUND OF THE INVENTION

In conventional rotary lawn mowers, the engine is enclosed in a shroud in an effort to reduce the noise pollution and to improve the physical appearance of the mower as well as protecting the engine components from damage. With these types of mowers, the placement of the grass catcher container has been improved by moving the container from a side mounting arrangement to a rear mounted position. However, this arrangement introduced problems with respect to access to the engine which required either complete removal of the shroud or pivoting of the shroud about a horizontal axis. In either case, the grass catcher container and the support must be removed to provide the necessary access to and clearance for the shroud. This is a very irritating inconvenience and a source of trouble. The removal of the flexible container and support eventually results in damage to the container as by holes being torn in the container and the metal support becoming bent from accidental misuse.

SUMMARY OF THE INVENTION

As herein disclosed, a rotary mower is provided with a rear mounted flexible grass catcher such as a fabric bag and a rear mounted support therefor. The support is pivotally mounted on the mower in a manner that the weight of the bag holds the bag support in the correct operating position. As the shroud is raised to an open position, it pivots the support rearwardly to a out-of-the-way position. When the shroud is closed, the support may simply pivot forwardly by hand to its original position. In addition, the rear mounted container support serves as a guard to prevent damage to the bag through contact with an adjacent rear wheel.

One of the principal objects of the present invention is to provide a support for a rear mounted grass catcher bag which is maintained in operative position by the weight of the bag thus eliminating the need for clamps or catches.

Still another object of the present invention is to provide a support for a rear mounted grass catcher bag which may be easily displaced from an operative position to a retracted position in which the lawn mower may be moved for engine servicing.

Yet another object of the present invention is to provide a support for a rear mounted grass catcher bag that provides guard protection to the bag from engagement with adjacent rear wheels.

DESCRIPTION OF THE INVENTION

FIG. 1 is a view in right-side elevation of a rotary lawn mower in which the present invention is incorporated, the rear mounted grass catcher bag being shown connected to the pivotal support and in operative forward position;

FIG. 2 is a view as seen from the rear of the lawn mower with parts removed to more clearly show the pivotal support for the rear mounted container;

FIG. 3 is a view in right-side elevation of the rotary lawn mower showing the engine shroud, rear bag support and grass catcher bag displaced to provide access to the mower engine; and FIG. 4 is a fragmentary view in left-side elevation of the lawn mower of FIG. 1 showing the features of the leftside of the grass bag pivotal rear support.

DESCRIPTION OF THE PREFERRED EMBODIMENT OF THE INVENTION

The drawings illustrate a rotary lawn mower 10 having a housing or frame 11 which carries a plurality of wheels 12. A gasoline engine 14 is mounted on the deck or upper surface 15 of the frame 11. The engine drive shaft 16 extends downwardly through the top surface of the frame 11 and receives a rotary cutting blade 17. A handle 21 for guiding the mower over the ground is secured to brackets 18 and 19 which are upstanding from the upper deck surface 15 of the frame 11 at the rear thereof.

An engine shroud 26 covers the engine 14 and has a rearwardly and downwardly extending rear portion 27. The lower end of the rear portion 27 of the shroud 26 is secured to a transversely extending hinge 28. Thus, the shroud 26 when in position provides protection for the various forwardly located engine components such as the spark plug and lead and the carburetor (not shown). The downwardly sloping rear portion 27 of the shroud offers protection to the various other engine components. The shroud also serves as an isolating protector to provide a barrier to prevent accidental contact with the hot engine.

The starter protective screen 31 extends through the top of the shroud 26 as does the handle 32 of the starter pull cord. All other portions of the engine 14 are protected by the shroud 26.

A rearwardly directing grass clipping chute 36 is removably secured to the deck surface 15 and communicates with the interior of the frame by means of a suitable access opening 37 formed in the deck. The chute 36 extends rearwardly of the engine 14 along the right side thereof and terminates in an open discharge end 38. The peripheral edge of the discharge end 38 of the chute 36 is provided with a rim or flange 39 to which an entrance sleeve 40 of a grass bag 41 is releasably attached.

The bag 41 is generally of the configuration of a pyramidal frustum with the small end thereof disposed adjacent the mower engine 14. The bag 41 is closed on all sides thereof with the exception that an opening is formed in the rear panel which is closed by a zipper (not shown) as is well known. Extending from the right side of the bag 14 toward the upper edge thereof is the grass entrance sleeve portion 40 which is connectible to the discharge end 38 of the chute 36. To this purpose the free end of the bag sleeve portion 42 is provided with an elastic cord which snaps behind the rim or flange 39 of the chute.

To support the bag 41 in operative position behind the mower, the upper rear portion of the bag 41 is provided with a transversely extending loop portion 43. A rear bag handle 44 is engaged with the bag loop 43 and has a handle portion 47 formed with side loops 48, the right-side loop being shown. The side loops 48 are constructed so as to engage over a bar 46 which extends transversely between the side bars of the mower handle 21.

To support the forward portion of the bag 41, there is provided a novel bag support 55. As contemplated, the forward rear bag support 55 is a one-piece member which has rearwardly extending left- and right-side portions or members 56 and 57, respectively. As best shown in FIGS. 1 and 2, the rearwardly extending right-side member 57 has an upwardly extending arcuated portion 61, which at the right end thereof, as viewed in FIG. 1, is connected a lateral outwardly extending portion 62. The arcuate portion 61 joins a vertical downwardly extending portion 63 which at its lower end connects with an inwardly extending horizontal portion 64. This horizontal portion 64 is pivotally engaged in a suitable opening provided in the vertical plate 18.

The inwardly extending end of the horizontal portion 62 is connected to a forwardly upwardly inclined portion 66 which at its upper end includes a revert portion 67. The revert portion 67 connects with a horizontal transversely extending portion 68, which, in turn, connects with an upwardly inclined portion 69. The portion 69 has a connection with a horizontal portion 71. As can be seen in FIG. 2, the left end of the portion 71 connects with a downwardly inclined left-side portion 72 which at its lower end connects with a horizontal outwardly extending portion 73. The outer end of portion 73 connects with a rearwardly extending portion 74 which, in turn, connects with a downwardly inclined portion 76. The end of portion 76 turns inwardly and is pivotally received in a suitable opening formed in the vertical plate 19. Thus, the rear support 55 is supported for pivotal movement in the plates 18 and 19. As shown in FIG. 2, the rear support 55 when in forward bag supporting position, the side members 66 and 72 are disposed on either side of the shroud 26 free and clear of the shroud.

To attach the front end of the bag 41 to the support 55, a forward bag handle 81 is provided. The bag handle 81 includes spaced apart right and left hook portions 82 and 83, respectively. These hook portions are spaced apart and connected to leg portions of a U-shaped handle 84. Extending horizontally outwardly from the lower end of the hook portions 82 and 83 are supports 86 and 87, respectively. These supports engage in spaced loops, the loop 88 associated with the support portion 86 being shown in FIG. 3. Thus, the bag handle 81 is connected to the forward end of the bag 41 and by engaging the hooks 82 and 83 over the horizontal portion 68 of the bag support 55, the bag is supported in operative grass receiving position as depicted in FIG. 1. In this position, the revert 67 and the inclined portion 69 of each end of the portion 68 serve as abutments to effectively prevent the bag handle 81 from being displaced laterally out of operating position.

As viewed in FIG. 2, the stirrup configured arrangement 91 of the support 55 at the right-hand side thereof provides protection for the bag from engagement with the adjacent wheel. As can be seen in FIG. 1, the entrance sleeve portion 40 of the bag 41 tends to ride the arcuate portion 61 of the support. Thus, when the bag 41 is overloaded with clippings, excess clippings in the sleeve tend to cause the sleeve to sag and engage the wheel. However, the arcuate portion 61 of the support prevents such engagement and gives support to the sleeve.

With the support 55, access to the engine 14 is facilitated in that it is only required to unsnap the sleeve connection with the chute. When this is accomplished, the shroud 26 can be pivoted upwardly in the hinge 28 to thereby expose the engine. In lifting the shroud 26, the support 55 displaces rearwardly pivoting on the pivots 64 and 77. Since the support 55 displaces with the lifting of the shroud 26, the bag 41 moves with the support 55 collapsing upon itself, as depicted in FIG. 3. Thus, in servicing the engine 14, there is no need to remove the bag 41 or the support 55 before such servicing. Since there is no need to dismantle the bag and support, the danger of loss or inadvertent damage to the parts due to being stepped on, etc. is eliminated.

It should be noted that the rear support 55 requires no latches of fasteners to maintain it in forward operating position. This is true because of the weight of the forwardly inclined support, when in operating position, and in combination with the weight of the bag 41 tends to rotate the support forwardly.

The embodiments of the invention in which an exclusive property or privilege is claimed are defined as follows:

1. In a rear support for a rear mounted grass catching bag of a rotary lawn mower, the lawn mower including
    a housing which mounts an engine for driving a rotary blade located within the housing and provided with an engine shroud which substantially encloses the engine and which is movably secured to the housing for movement to a retracted rearward position, the housing having a rearwardly facing grass discharge chute, the lawn mower also having a handle for guiding the mower;
    a rear support pivotally connected to the housing rearwardly of the engine and movably between a forward operating position and a rearward retracted position;
    a flexible grass catching bag having a grass entrance sleeve releaseably connectible to the mower grass discharge chute;
    first means detachably secured to the forward end of said bag and releaseably connectible with said rear support;
    second means detachably secured to the rear end of said bag and releasably connectible with the mower handle;
    whereby said rear support maintains said grass catching bag in position to receive grass clippings from the mower chute and upon pivotal movement of said rear support to a retracted rearward position, said bag moves with said support collapsing upon itself thereby eliminating the need to dismantle the bag from the support.

2. In a rear support for a rear mounted grass catching bag of a rotary lawn mower, the lawn mower including
    a housing which mounts an engine for driving a rotary blade located within the housing and provided with an engine shroud which substantially encloses the engine and which is movably secured to the housing for movement to a retracted rearward position, the housing having a rearwardly facing grass discharge chute, the lawn mower also having a handle for guiding the mower;
    a rear support detachably pivotally mounted to the rearward end of the housing, said rear support being inclined forwardly when in operating position overlying the engine shroud but not in contact therewith;
    a flexible grass catching bag having a grass entrance sleeve which is releasably connectible to the grass discharge chute of the mower;
    a first bag handle releaseably connected to the forward upper edge of said grass catching bag and operable to releasably connect with said rear support;

a second bag handle releasably connected to rearward upper edge of said grass catching bag and operable to releasably connect with the mower handle;

whereby said bag is suspended in operative grass receiving position rearwardly of the mower and upon movement of the engine shroud to a rearward retracted position, said rear support and said bag move rearwardly with the shroud to thereby eliminate the need for disconnecting the rear support or said bag from the mower when the shroud is retracted for access to the engine.

3. A rear support for a rear mounted grass catching bag of a rotary lawn mower according to claim 2 wherein said rear support is a formed single piece member having a generally U-shaped configuration including a horizontal portion to which depending legs having end portions of the U-shaped member are connected, said horizontal portion having spaced apart abutments; and, said first bag handle being releaseably connected to said horizontal portion between said spaced apart abutments;

whereby lateral displacement of said first bag handle when in connected position on said rear support is effectively prevented by said abutments.

4. A rear support for a rear mounted grass catching bag of a rotary lawn mower according to claim 3 wherein one of said end portions is formed with an arcuated section which rises above an adjacent mower wheel and serves to maintain said grass catching bag free and clear of the wheel.

* * * * *